United States Patent
Huo et al.

(10) Patent No.: US 11,928,629 B2
(45) Date of Patent: Mar. 12, 2024

(54) GRAPH ENCODERS FOR BUSINESS PROCESS ANOMALY DETECTION

(71) Applicant: INTERNATIONAL BUSINESS MACHINES CORPORATION, Armonk, NY (US)

(72) Inventors: Siyu Huo, White Plains, NY (US); Prabhat Maddikunta Reddy, Danbury, CT (US); Vatche Isahagian, Belmont, MA (US); Vinod Muthusamy, Austin, TX (US); Prerna Agarwal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 17/664,719

(22) Filed: May 24, 2022

(65) Prior Publication Data

US 2023/0385732 A1     Nov. 30, 2023

(51) Int. Cl.
*G06Q 10/0633* (2023.01)
*G06N 3/088* (2023.01)
*G06Q 10/0635* (2023.01)

(52) U.S. Cl.
CPC ......... *G06Q 10/0633* (2013.01); *G06N 3/088* (2013.01); *G06Q 10/0635* (2013.01)

(58) Field of Classification Search
CPC ................................................ G06Q 10/0633
See application file for complete search history.

(56) References Cited

U.S. PATENT DOCUMENTS

| 11,163,084 | B1* | 11/2021 | Theyab ..................... G01V 1/50 |
| 11,455,146 | B2* | 9/2022 | Rajesh ...................... G06F 8/35 |
| 2019/0228353 | A1 | 7/2019 | Gefen | |
| 2020/0293617 | A1* | 9/2020 | Luo ........................... G06N 3/08 |
| 2020/0311613 | A1* | 10/2020 | Ma ........................... G06N 20/20 |
| 2021/0019674 | A1* | 1/2021 | Crabtree .............. G06V 30/274 |

(Continued)

FOREIGN PATENT DOCUMENTS

| CN | 112966595 A | 6/2021 |
| CN | 112559598 B | 12/2021 |
| IN | 202141025719 A | 6/2021 |

OTHER PUBLICATIONS

Huo, et al., "Graph Autoencoders for Business Process Anomaly Detection," International Conference on Business Process Management [conference paper], [accessed on Apr. 28, 2022], 16 pages, vol. 12875, Retrieved from the Internet: https://link.springer.com/chapter/10.1007/978-3-030-85469-0_26>.

(Continued)

*Primary Examiner* — Andre D Boyce
(74) *Attorney, Agent, or Firm* — Elliot J. Shine

(57) ABSTRACT

A method, computer system, and a computer program product for anomaly detection is provided. The present invention may include converting business process logs into a graphical data structure. The present invention may include generating an optimized graph encoding for anomaly detection using an unsupervised machine learning model. The present invention may include computing an anomaly score for each activity of the business process log using a process aware metric based on feature representation. The present invention may include labeling each of the one or more data points with a high anomaly score.

20 Claims, 9 Drawing Sheets

(56) References Cited

U.S. PATENT DOCUMENTS

| | | | |
|---|---|---|---|
| 2022/0207326 A1* | 6/2022 | Zaker Habibabadi | ............ G06N 3/045 |
| 2022/0318715 A1* | 10/2022 | Goel | ............ G06N 3/045 |
| 2023/0107316 A1* | 4/2023 | Ripa | ............ G06F 9/451 700/29 |

OTHER PUBLICATIONS

Ko, et al., "Detecting anomalies in business process event logs using statistical leverage," Information Science, 2020, pp. 53-67, vol. 549, Retrieved from the Internet: <URL: https://www.sciencedirect.com/science/article/abs/pii/S0020025520311038?via%3Dihub>.

Maaradjii, et al., "Fast and Accurate Business process Drift Detection," International Conference on Business Process Management [conference paper], Aug. 2015, 17 pages, DOI: 10.1007/978-3-319-23063-4_27, Retrieved from the Internet: <URL: https://link.springer.com/chapter/10.1007/978-3-319-23063-4_27>.

Mell, et al., "The NIST Definition of Cloud Computing", National Institute of Standards and Technology, Special Publication 800-145, Sep. 2011, 7 pages.

Nguyen, et al., "Autoencoders for improving quality of process event logs," Expert Systems With Applications, Oct. 2019, pp. 132-147, vol. 131, DOI: 10.1016/j.eswa.2019.04.052, Retrieved from the Internet: <URL: https://www.sciencedirect.com/science/article/abs/pii/S0957417419302829>.

Nolle, et al., "Analyzing Business Process Anomalies Using Autoencoders," Mar. 3, 2018, 20 pages, arXiv:1803.01092v1, Retrieved from the Internet: <URL: https://arxiv.org/pdf/1803.01092.pdf>.

Nolle, et al., "Unsupervised Anomaly Detection in Noisy Business Process Event Logs Using Denoising Autoencoders," Lecture Notes in Computer Science [conference paper], Oct. 2016, 16 pages, DOI:10.1007/978-3-319-46307-0_28, Retrieved from the Internet: <URL: https://www.researchgate.net/publication/308390924_Unsupervised_Anomaly_Detection_in_Noisy_Business_Process_Event_Logs_Using_Denoising_Autoencoders>.

Rozinat, et al., "Conformance checking of processes based on monitoring real behavior," Information Systems, Mar. 2018, pp. 64-95, vol. 33, Issue 1, Retrieved from the Internet: <URL: https://www.sciencedirect.com/science/article/abs/pii/S030643790700049X?via%3Dihub>.

Scarselli, et al., "The graph neural network model," IEEE Transactions on Neural Networks, Jan. 2009, 22 pages, vol. 20, No. 1, DOI: 10.1109/TNN.2008.2005605, Retrieved from the Internet: <URL: https://ro.uow.edu.au/infopapers/3165/>.

Simonovsky, et al., "Dynamic Edge-Conditioned Filters in Convolutional Neural Networks on Graphs," Aug. 8, 2017, 12 pages, arXiv:1704.02901v3, Retrieved from the Internet: <URL: https://arxiv.org/abs/1704.02901>.

Vengertsev, et al., "Anomaly Detection in Graph: Unsupervised Learning, Graph-based Features and Deep Architecture," Stanford University [technical report], [accessed on Apr. 7, 2022], 8 pages, Retrieved from the Internet: <URL: http://snap.stanford.edu/class/cs224w-2015/projects_2015/Anomaly_Detection_in_Graphs.pdf>.

Zhou, et al., "Anomaly Detection with Robust Deep Autoencoders," KDD '17: Proceedings of the 23rd ACM SIGKDD International Conference on Knowledge Discovery and Data Mining [research article], Aug. 13-17, 2017 [accessed on Apr. 28, 2022], pp. 665-674, Retrieved from the Internet: <URL: https://dl.acm.org/doi/abs/10.1145/3097983.3098052>.

Seeliger, et al., "ProcessExplorer: Intelligent Process Mining Guidance", Springer Nature Switzerland AG 2019, T. Hildebrandt et al (Eds.): BPM 2019, LNCS 11675, pp. 216-231, 2019, https://doi.org/10.1007/978-3-030-26619-6_15.

\* cited by examiner

| CaseID | Activity | Timestamp | Variable 1 | Variable 2 |
|--------|----------|-----------|------------|------------|
| 0 | A | 3/1/21 | 1 | 1 |
| 0 | B | 3/2/21 | 2 | 1.8 |
| 0 | C | 3/3/21 | 4 | 2.5 |
| 0 | B | 3/4/21 | 7 | 3.1 |
| 0 | C | 3/5/21 | 11 | 3.6 |
| 0 | D | 3/6/21 | 16 | 4 |
| 0 | C | 3/7/21 | 22 | 4.3 |
| 0 | B | 3/8/21 | 29 | 4.5 |
| 0 | E | 3/9/21 | 37 | 4.6 |

GRAPH ENCODERS FOR BUSINESS PROCESS ANOMALY DETECTION

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): [Graph Autoencoders for Business Process Anomaly Detection, Siyu Huo, Hagen Völzer, Prabhat Reddy, Prerna Agarwal, Vatche Isahagian, and Vinod Muthusamy, Sep. 6, 2021, made publicly available, p. 1-16]

BACKGROUND

The present invention relates generally to the field of computing, and more particularly to anomaly detection.

A business process, business method and/or business function may be a collection of related, structured activities or tasks by people and/or equipment in which a specific sequence produces a service and/or product for a particular customer and/or customers. Business process data may include many different aspects, such as, but not limited to, activities, ordering, duration and/or wait times, acting resources and/or roles, business objectives, associated values, states, milestones, decisions, and/or process outcomes, amongst other aspects. Business processes may change over time due to dynamic business requirements.

Detecting anomalies within a business process may be important for a business in at least, identifying issues preemptively and/or adjusting and/or optimizing inefficient and/or malfunctioning components within a business process. A popular type of anomaly detector may be an autoencoder, which may be an artificial neural network that learns an efficient representation of the input data, i.e., an encoding or embedding, together with a decoding that reproduces the input data from that internal representation in a way that minimizes the reproduction error. A threshold on the reproduction error identifies anomalous input data. However, current autoencoder based approaches utilized in anomaly detection fail to consider structural information and treat business process event logs as simple flat event series data.

The present invention utilizes a Graph Autoencoder (GAE) approach which may capture extra structural process information and/or relations among activity occurrences, which may be key components in process data, in addition to processing attribute features, and may treat these activities as nodes and/or functional central components within the neural network. Additionally, as compared with the current autoencoder based approaches, the GAE simplifies training by recreating abstract structural information (i.e., binary edge labels) instead of data attributes themselves, which may make it easier for the GAE training to converge.

SUMMARY

Embodiments of the present invention disclose a method, computer system, and a computer program product for anomaly detection. The present invention may include converting business process logs into a graphical data structure. The present invention may include generating an optimized graph encoding for anomaly detection using an unsupervised machine learning model. The present invention may include computing an anomaly score for each activity of the business process log using a process aware metric based on a feature representation. The present invention may include labeling each of the one or more data points with a high anomaly score. Accordingly, the present invention the ability to detect anomalies within a business process in terms of accuracy, noise endurance, and/or generalizability by enriching the autoencoder input data representation with activity relationships.

The present invention may include generating an optimized graph encoding for anomaly detection using an unsupervised machine learning method, wherein generating the optimized graph encoding for anomaly detection includes applying a graph neural network (GNN) with an edge-conditioned convolution (ECC). Accordingly, the present invention may improve the ability to capture structural process information and/or relations amongst activity occurrences.

The present invention may include computing an anomaly score for each activity of the business process log using a process aware metric-based on a feature representation, wherein computing the anomaly score includes a reconstruction loss (e.g., construction loss) from the GAE, wherein the high anomaly score is determined in comparison to an anomaly threshold value. Accordingly, the present invention may improve the ability to detect anomalously executed cases in a business process and enable early warnings to a user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
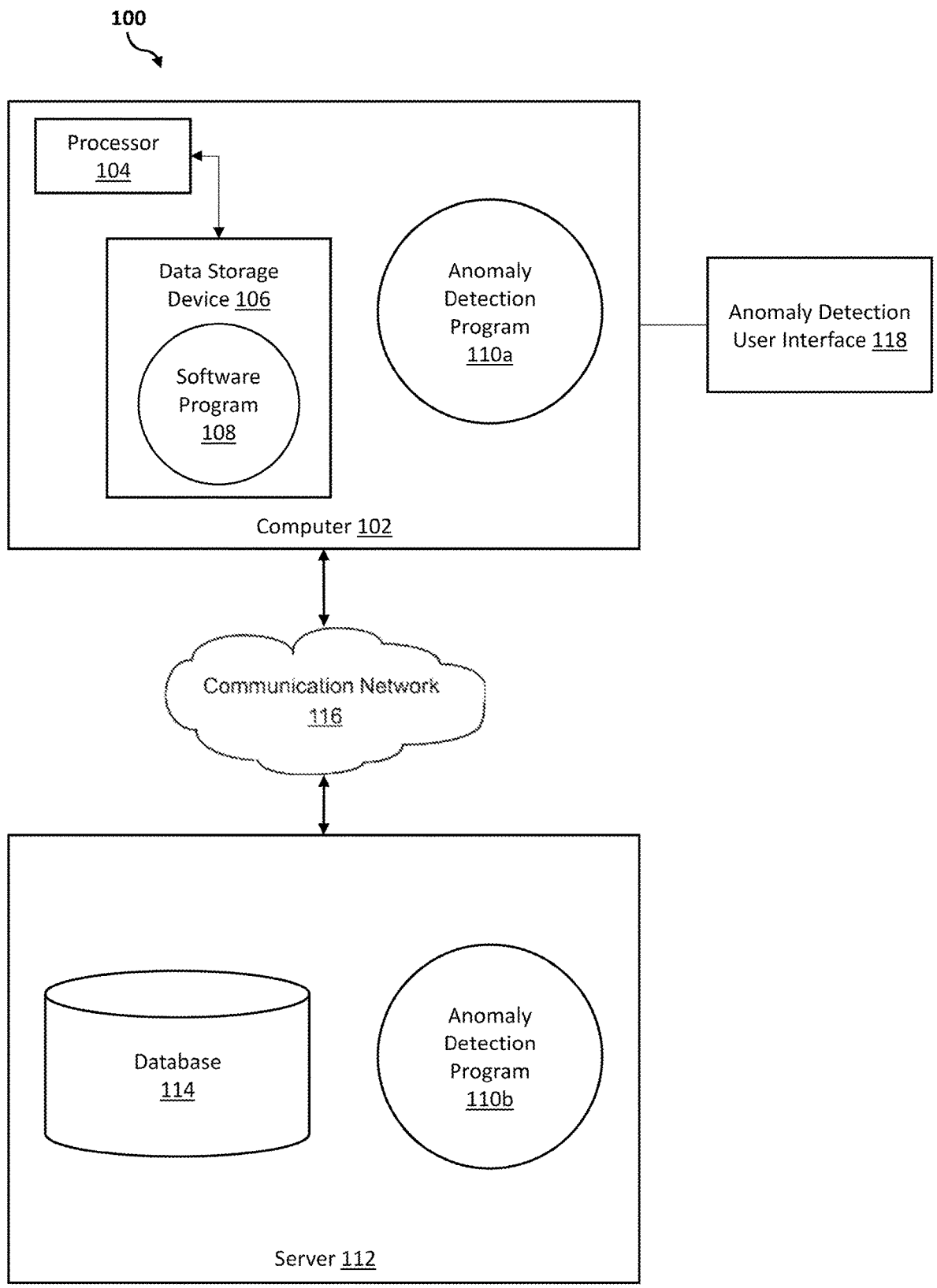
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for anomaly detection. As such, the present embodiment has the capacity to improve the technical field of anomaly detection by enriching autoencoder input data representation with activity relationships. More specifically, the present invention may include converting business process logs into a graphical data structure. The present invention may include generating an optimized graph encoding for anomaly detection using an unsupervised machine learning model. The present invention may include computing an anomaly score for each activity of the business process log using a process aware metric based on feature representation. The present invention may include labeling each of the one or more data points with a high anomaly score.

As described previously, a business process, business method and/or business function may be a collection of related, structured activities or tasks by people and/or equipment in which a specific sequence produces a service and/or product for a particular customer and/or customers. Business process data may include many different aspects, such as, but not limited to, activities, ordering, duration and/or wait times, acting resources and/or roles, business objectives, associated values, states, milestones, decisions, and/or process outcomes, amongst other aspects. Business processes may change over time due to dynamic business requirements.

Detecting anomalies within a business process may be important for a business in at least, identifying issues preemptively and/or adjusting and/or optimizing inefficient and/or malfunctioning components within a business process. A popular type of anomaly detector may be an autoencoder, which may be an artificial neural network that learns an efficient representation of the input data, i.e., an encoding or embedding, together with a decoding that reproduces the input data from that internal representation in a way that minimizes the reproduction error. A threshold on the reproduction error identifies anomalous input data. However, current autoencoder based approaches utilized in anomaly detection fail to consider structural information and treat business process event logs as simple flat event series data.

The present invention utilizes a Graph Autoencoder (GAE) approach which may capture extra structural process information and/or relations among activity occurrences, which may be key components in process data, in addition to processing attribute features, and may treat these activities as nodes and/or functional central components within the neural network. Additionally, as compared with the current autoencoder based approaches, the GAE simplifies training by recreating abstract structural information (i.e., binary edge labels) instead of data attributes themselves, which may make it easier for the GAE training to converge.

Therefore, it may be advantageous to, among other things, convert business process logs into a graphical data structure, generate an optimized graph encoding for anomaly detection using an unsupervised machine learning model, compute an anomaly score for each activity of the business process log using a process aware metric-based on a feature representation, and label each of the one or more data points with a high anomaly score.

According to at least one embodiment, the present invention may improve training by utilizing the GAE in recreating abstract structural information (i.e., binary edge labels) instead of data attributes themselves, which may make it easier for the GAE training to converge.

According to at least one embodiment, the present invention may improve anomaly detection by utilizing a Graph Autoencoder approach which may capture extra structural process information and/or relations among activity occurrences, which may be key components in process data, in addition to processing attribute features, and may treat these activities as nodes and/or functional central components within the neural network.

Accordingly, the present invention the ability to detect anomalies within a business process in terms of accuracy, noise endurance, and/or generalizability by enriching the autoencoder input data representation with activity relationships.

Accordingly, the present invention may improve the ability to capture structural process information and/or relations amongst activity occurrences by generating an optimized graph encoding for anomaly detection using an unsupervised machine learning method.

Accordingly, the present invention may improve the ability to detect anomalously executed cases in a business process and enable early warnings to a user by utilizing a reconstructed process graph with edge probability to interpret an anomalous case and presented the reconstructed process graph to a user in an anomaly detection user interface.

Accordingly, the present invention may improve the ability for a user to address adjust and/or optimize a business process based on at least inefficient and/or malfunctioning components within their business identified based on a high anomaly score associated with one or more activities of the business process.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an anomaly detection program 110a. The networked computer environment 100 may also include a server 112 that is enabled to run an anomaly program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 7, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the anomaly detection program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the anomaly detection program program 110a, 110b (respectively) to identify anomalous events within a business process. The anomaly detection method is explained in more detail below with respect to FIGS. 2 through 6.

Figure 2:
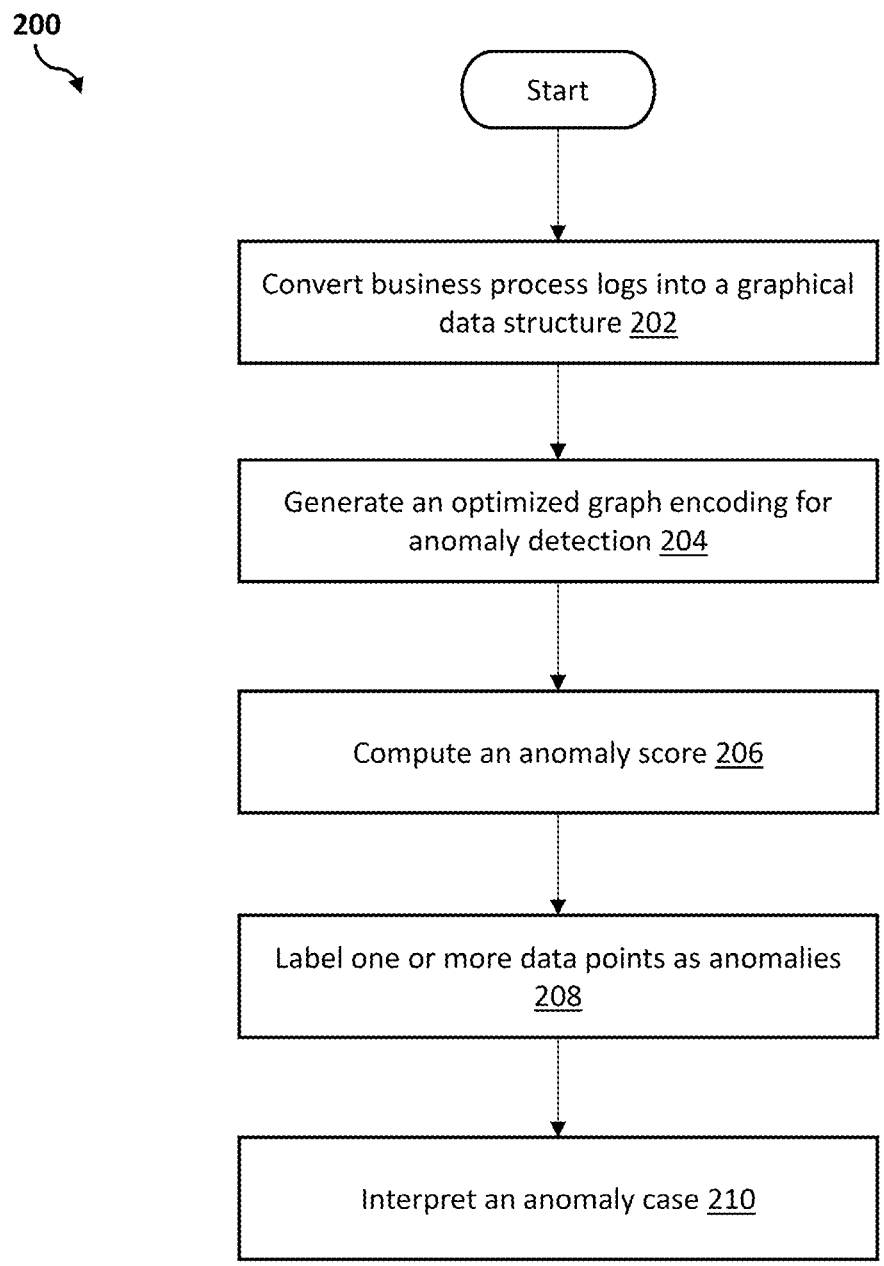
FIG. 2 is an operational flowchart illustrating a process for anomaly detection according to at least one embodiment.

Referring now to FIG. 2, an operational flowchart illustrating the exemplary anomaly detection process 200 used by the anomaly detection program 110a and 110b according to at least one embodiment is depicted.

At 202, the anomaly detection program 110 converts business process event logs into a graphical data structure. Business process event logs may be a collection of time-stamped event records produced by the execution of a business process, wherein each event record may include informative data related to an execution of an event within a business process.

The business process event logs may be received from a user in an anomaly detection user interface 118. The anomaly detection user interface 118 may be displayed by the anomaly detection program 110 in at least an internet browser, dedicated software application, and/or as an integration with a third party software application. As will be explained in more detail below, the anomaly detection program 110 may utilize a training phase, validation phase, and/or an anomaly detection phase. The training phase will be described in more detail below with respect to FIG. 4 and may be utilized by the anomaly detection program 110 in at least training an autoencoder. The validation phase will be described in more detail below with respect to FIG. 5 and may be utilized by the anomaly detection program 110 in at least determining an anomaly threshold θ and/or tuning model hyper-parameters. The anomaly detection phase will be described in more detail below with respect to FIG. 6 and may be utilized by the anomaly detection program 110 in at least computing an anomaly score and/or labeling one or more data points within the business process event logs received from the user as anomalies. The training data set and/or validation data set utilized by the anomaly detection program 110 in the training phase and/or validation phase may be based on the business process event logs received from the user in the anomaly detection user interface 118 and/or based on business process event logs from one or more publicly available data sources stored in a knowledge corpus (e.g., database 114).

The informative data related to the execution of an event may include, but is not limited to including, time stamps, corresponding activity (e.g., work item, task), identification of resource performing an activity, activity ordering, duration and/or wait times, the acting resources and/or roles, business objects and/or associated values, states, milestones, decisions, and/or process outcomes, amongst other informative data related to the execution of the event. As will be explained in more detail below, parts and/or combinations of the informative data as well as abstractions, transformations, and/or aggregations thereof, such as Key Performance Indicators (KPIs), sliding windows, and/or rolling averages may also be utilized by the anomaly detection program 110. The business process event logs received from the user in the anomaly detection user interface 118 may be existing business process event logs for a topic, such as, but not limited to loan approval, recruitment, invoicing, order processing, customer onboarding, accounting, market research, product development, amongst other topics which may be achieved with a business process by the user. The existing business process event logs may be utilized by the anomaly detection program 110 in training the model such that the anomaly detection program 110 may identify anomalies within new incoming business process event logs of the same topic. For example, a business process event log for loan approval may include 6 Activities. Activity 1 may be recording a loan application, Activity 2 may be requesting a credit report, Activity 3 may be reviewing a credit report, Activity 4 may be verifying employment, Activity 5 may be reviewing a loan application, and Activity 6 may be sending loan approval. For each of these 6 Activities, the informative data may include, a case ID number, timestamp, responsible resource, department, and/or grouping. Business process event logs with corresponding informative data will be described in more detail with respect to FIG. 3A below.

For the business process event logs, the anomaly detection program 110 may utilize $U_E$ to denote the set of all event identifiers, $U_C$ to denote the set of all case identifiers, $U_A$ to denote the set of all activity identifiers, $U_T$ to denote the totally ordered set of all timestamp identifiers, and/or $U_F = \{U_{f1}, \ldots, U_{fk}\}$ to denote the identifier collections of event associated features with k categories: $\{f_1, \ldots, f_k\}$ for the business process event logs received from the user. The anomaly detection program 110 may additionally utilize a function $\pi_A: U_E \rightarrow U_A$ that may assign an activity to each event from a finite set of process activities and/or a function $\pi_T: U_E \rightarrow U_T$ that may assign a timestamp to each event of the business process event logs received from the user.

Additionally, when referring to at least a sequence, trace, and/or event log below, the set A, a finite sequence over A length n may be a function $\sigma \in A^*: \{1, \ldots, n\} \rightarrow A$, which may be written as $\sigma = \langle a_1, a_2, \ldots, a_n \rangle$, where $\sigma(i) = a_i$. For any sequence $\sigma$, the anomaly detection program 110 may define $|\sigma| = n$. A trace may be a finite non-empty sequence of events $\sigma \in U_E^*$ such that each event appears at most once and/or time may be non-decreasing. C may be utilized to denote all possible traces, in which an event log may be a set of traces $L \subseteq C$ such that each event appears at most once in an entire log, and/or each trace in the log represents an execution of one case assigned with a case identifier (e.g., Case ID) by the anomaly detection program 110 utilize a function $\pi_C: U_E \rightarrow U_C$.

The anomaly detection program 110 may convert the business process event logs into a graphical data structure by building a directed graph G=(V, E). The directed graph G=(V, E) may consist of a non-empty set of nodes V and/or a set of directed edges E. The anomaly detection program 110 may utilize activity names as nodes V in the directed graph G=(V, E) and/or edges E may correspond to every pair of adjacent events in a time ordered trace. For a directed edge $e_{u,v} = (u, v)$, $e_{u,v} \in E$, wherein u may be the tail node of e and v may be the head node of e. $N_d(v)$ may define neighbor, namely predecessor, nodes of v, which may return the nodes that directly connect to v with incoming edge towards v. Accordingly, a trace with n activities may result in n−1 directed angles, since the node may be identified by its activity name, an edge that may be formed by two adjacent activity names may include several duplicates in a trace. As will be explained in more detail below, the anomaly detection program 110 may utilize a positional embedding method by using a specific location of adjacent events in a vector p to represent edge positional information and associated activity attributes, and the vector p may be treated as an edge feature vector. This may enable the anomaly detection program to represent duplicate edges by digits in different locations within a same positional vector. As will be explained in more detail below, a trace with n activities may result in k≤n−1 positional vectors p which may correspond to the unique k edges. The anomaly detection program 110 may represent the graphical data structure with k label vectors m∈ $\{0,1\}^{t_m-1}$, which may record activity occurrence information and/or may represent targets of the autoencoder's decoding output.

The anomaly detection program 110 may construct the directed graph G=(V, E) for the business process event logs by at least, obtaining a maximum trace length $t_m$ and/or feature embedding dimension $d_e$, generating edges using activity-activity pairs, generating positional vectors p and/or edge label vectors m associated with each edge, and/or looping over the third step (e.g., generating positional vectors p and/or edge label vectors m associated with each edge) until an end of each trace.

In an embodiment, the anomaly detection program 110 may obtain the maximum trace length $t_m$ and/or the feature embedding dimension $d_e$ by computing the maximum trace length $t_m$ utilizing the following equation:

$$t_m = \max\{|\sigma|: \sigma \in U_E\}$$

$U_E$ representing the events of the business process event logs. The anomaly detection program may compute an event attribute feature embedding with dimension $d_e$ utilizing the following equation:

$$d_e = d_n + d_c$$

by concatenating activity numerical features (e.g., rescaling with dimension $d_n$) and/or categorical features (e.g., one-hot encoding with dimension $d_c$) of event attributes. The anomaly detection program 110 may track all existing activities as nodes and/or assign all existing activities an initial node embedding $h_v^0$ (e.g., one-hot encoding).

Continuing with the same embodiment, the anomaly detection program 110 may generate edges using activity-activity pairs by generating n−1 activity pairs based on occurrence order of the plurality of activities of the business process event logs based on at least occurrence order, while maintaining the occurrence order. For example, trace (A, B, C, B, C) may end up in 4 ordered activity-activity pairs, (A, B), (B, C), (C, B), and (B, C). Which may define the edges E in the constructed graph corresponding to the business process event logs as detailed above.

Continuing with the same embodiment, the anomaly detection program 110 may generate positional vectors p and/or edge label vectors m associated with each edge generated using the activity-activity pairs (e.g., second step). The anomaly detection program 110 may treat the activity that happened first as u, and the other as v within each of the one or more activity-activity pairs at position i∈[1, n−1]. The anomaly detection program 110 may also compute the edge feature vector based on the event attribute feature embedding distance, subtraction of u and v, while putting this computed vector in index i of the positional vector p which may have the dimension $d_p = (t_m - 1) \times d_e$, wherein each compound vector may take $d_e$ space in p initialized with 0, and $t_m - 1$ may be the number of activity-activity pairs for a longest trace. Finally, the anomaly detection program 110 may build a corresponding binary edge label vector m∈ $\{0, 1\}^{t_m-1}$, by setting position i to 1 and all other positions to 0.

Continuing with the same embodiment, the anomaly detection program 110 may loop over the third step (e.g., generating positional vectors p and/or edge label vectors m associated with each edge). The output may be an n−1 positional vector p and edge label vectors m associated with each edge. As described previously, there may be duplicate edges. In the case of duplicate edges, the anomaly detection program 110 may aggregate positional vectors p and edge label vectors m with names of u and v as keys (e.g., 'AB', 'BC', 'CB'). In this embodiment, we may end up with k≤n−1 positional vectors p as final edge features and edge label vectors m which may be associated with each unique edge that may appear in the trace, with the initial code features $h_v^0$ specified by one-hot encoding of the activity name. Graph construction with respect to business process event logs will be described in more detail with respect to FIG. 3B below.

At 204, the anomaly detection program 110 generates an optimized graph encoding for anomaly detection. The anomaly detection program 110 may generate the optimized graph encoding for anomaly detection using an unsupervised machine learning method.

The unsupervised machine learning method may include applying a graph neural network (GNN) with an edge-conditioned convolution (ECC). As will be explained in more detail below, by leveraging graph structural information of a business process corresponding to the business process event logs the anomaly detection program 110 may enrich feature representation by encoding at least structural information and/or business process attributes.

The ECC filters in the graph autoencoder may be utilized by the anomaly detection program 110 in at least transforming each node representation computed from a previous layer of the neural network and may combine them with their transformed neighbor node representations conditioning on edge features.

In an embodiment, l∈ $\{1, \ldots, l_m\}$ may be the layer index in a feed-forward neural network, and $h_v^l$, $h_{e_{u,v}}^l$ may be the vector representation for the node v and edge $e_{u,v}$ at layer l, layer 0 may be the input layer. The node representation updating through ECC in the graph may be formulated as:

$$h_v^l = \phi\left(F^l(h_v^{l-1}; w) + \sum_{u \in N_d v} F_e^l(h_{e_{u,v}}; w_e) h_u^{l-1} + b^l\right)$$

where $\phi$ may be the activation function $F^l: \mathbb{R}^{d_{l-1}} \to \mathbb{R}^{d_l}$, and $F_e^l: \mathbb{R}^{d_p} \to \mathbb{R}^{d_l \times d_{l-1}}$ may denote a parameterized feature transformation neural network for the node feature and the edge feature, and their corresponding parameters w, $w_e$. The anomaly detection program 110 may utilize a learnable random initialized bias term $b^l \in \mathbb{R}^{d_l}$ which may be learned through backpropagation during training, which will be described in more detail below with respect to FIG. 4.

Continuing with the same embodiment, the graph reconstruction (i.e., readout) may be treated as an edge label prediction and/or link prediction Based on the equation:

$$\hat{y} = R(\{h_v | v \in G\})$$

wherein the readout function R may be learned differentiable functions, in which associated parameters may be learned by back propagation based on an error function. The graph reconstruction edge-associated probability of recreating binary edge labels m may be formulated as:

$$m' = \text{sigmoid}(F_r(h_u^{l_m} \oplus h_v^{l_m}; w_r))$$

where u, v∈E, and $F_r$: $\mathbb{R}^{2dl_m} \to \mathbb{R}^{t_m-1}$ may denote neural network processing concatenated vector of $h_u$ and $h_v$ with trainable parameter $w_r$. $\oplus$ may denote vector concatenation.

Finally, the anomaly detection program 110 may define the reconstruction loss (e.g., construction error) of the target graph by an average of the binary cross entropy loss, as embodied in the following equation:

$$L(m', m) = \frac{1}{k(t_m - 1)} \left( -\sum_{i=1}^{k} \sum_{j=1}^{t_m-1} m_i^{(j)} \log(m_i'^{(j)}) + (1 - m_i^{(j)})(1 - \log(m_i'^{(j)})) \right)$$

wherein the autoencoder training objective, as will be explained in more detail with respect to FIG. 4, may be to minimize the output from the reconstruction loss (e.g., construction error) through backpropagation. As will be described in more detail below, the anomaly detection program 110 may utilize the reconstruction loss (e.g., construction error) of the target graph as an anomaly scoring function and/or in the training process 400 (e.g., training phase) for training the model.

At 206, the anomaly detection program 110 computes an anomaly score for each of the one or more data points of each business process event log. The anomaly detection program 110 may compute the anomaly score using a process aware metric-based on a feature representation.

The anomaly detection program 110 may compute the anomaly score for each of the one or more data points of each business process event log received from the user in the anomaly detection user interface 118. For example, the anomaly detection program 110 may receive business process event logs from the user for a loan approval business process which may be utilized in training and/or generating the optimized graph encoding for anomaly detection. The anomaly detection program 110 may continuously receive business process event logs from the user for the loan approval process as they are generated and compute the anomaly score for each of the one or more data points of each business process event log for the loan approval process. In this example, the anomaly detection program 110 may provide real time updates and/or alerts to the user in the anomaly detection user interface 118 as the anomaly score for each of the one or more data points of the business process event log may be computed.

As described above with respect to step 204, the anomaly detection program 110 may compute the anomaly score based on the reconstruction loss (e.g., construction error) from the graph autoencoder (GAE). In which the reconstruction loss (e.g., construction error) from the GAE may be determined utilizing the following equation:

$$L(m', m) = \frac{1}{k(t_m - 1)} \left( -\sum_{i=1}^{k} \sum_{j=1}^{t_m-1} m_i^{(j)} \log(m_i'^{(j)}) + (1 - m_i^{(j)})(1 - \log(m_i'^{(j)})) \right)$$

The anomaly detection program 110 may also leverage a prediction probability based on explicit graph edges, for each edge of a trace.

The anomaly detection program 110, may compute the anomaly score for each of the one or more data points of each business process event log received by the user. The anomaly detection program 110 may compute the anomaly scores in real time based on business process event logs which may be received by the anomaly detection program 110 in the anomaly detection user interface 118.

At 208, the anomaly detection program 110 labels one or more data points as anomalies. The anomaly detection program 110 may label the one or more data points as anomalies based on relatively high anomaly scores of the one or more data points. The relatively high anomaly scores may be anomaly scores above an anomaly threshold.

The anomaly threshold θ may be determined by the anomaly detection program 110 based on an average reconstruction loss (e.g., construction error) of the validation data as described in more detail below with respect to FIG. 5.

At 210, the anomaly detection program 110 interprets an anomaly case. The anomaly detection program 110 may interpret an anomaly case utilizing a reconstructed process graph with edge probability.

The anomaly detection program 110 may display the reconstructed process graph with corresponding edge probabilities to the user in the anomaly detection user interface 118. The anomaly detection program 110 may display the reconstructed graph utilizing the one or more edge probability scores and/or the process workflow graph which may illustrate the anomaly detection results. The anomaly detection program 110 may utilize numerical values and/or colors, amongst other indicators in the reconstructed process graph. The anomaly detection program 110 may alert the user in real time utilizing one or more notifications based on anomalies detected based on the determined anomaly threshold. The user may be able to customize alert setting such that alerts may be received by different methods (e.g., emails, flags within the anomaly user interface 118, direct messages to a mobile device, alerts to a specific user within an organization) depending on at least the difference between the anomaly score for a data point and the anomaly threshold and/or the business process in which the anomaly may be detected.

The anomaly detection program 110 may utilize the one or more parameters obtained from both the training and/or validating phased. The interoperability of anomaly may be obtained by printing out the reconstructed graph with edge probability during the inference phase. The anomaly detection program 110 may gradually adapt to changes within the business process by online-learning.

The anomaly detection program 110 may also provide one or more insights as to the nature of the one or more data points labeled as anomalies. The one or more insights may include one or more recommendations as to how to resolve the one or more data points labeled as anomalies and/or recommendations as to improvements of the business process. The one or more recommendations may be provided by the anomaly detection program 110 based on at least comparing data stored in the knowledge corpus (e.g., database 114), which may include business process event logs from one or more publicly available data sources, with the business process event logs of the user including the one or more data points labeled as anomalies. The anomaly detection program 110 may also store updates and/or changes to a business process within the knowledge corpus (e.g., database 114) which may be utilized in learning how different updates and/or changes may impact the business process.

Figures 3A, 3B:
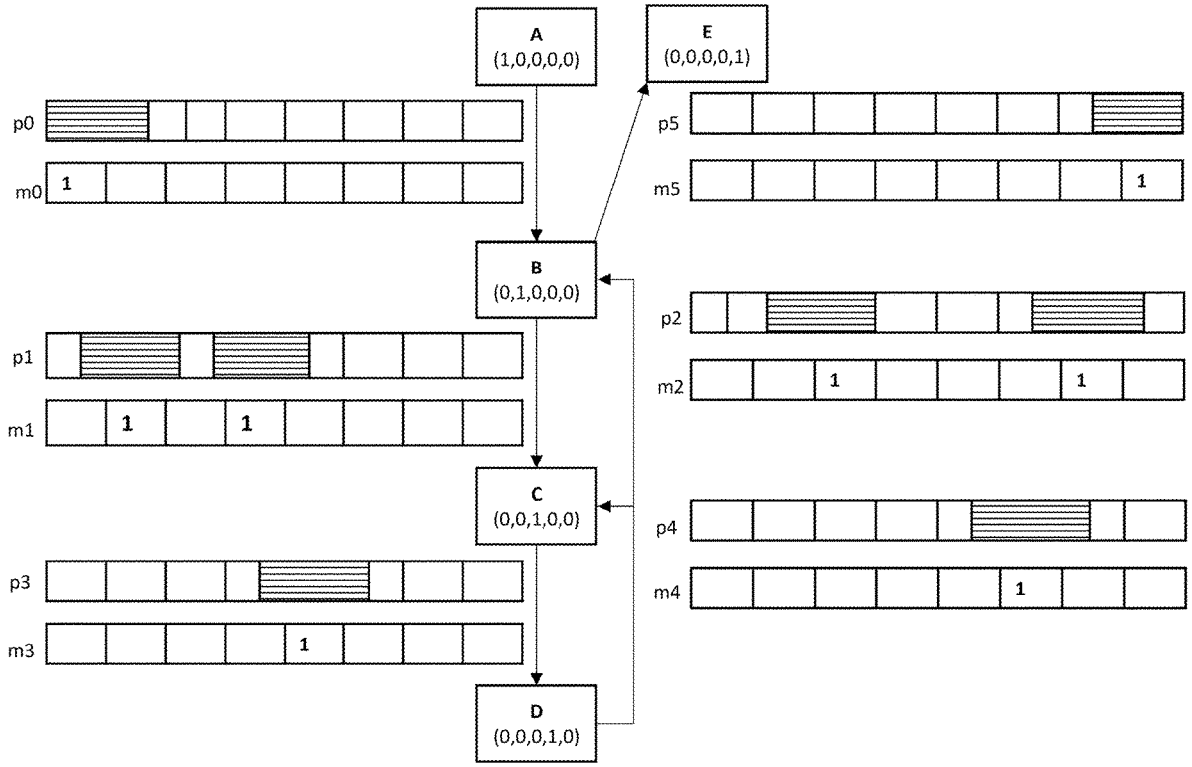
FIG. 3A is an exemplary illustration of a business process event log.
FIG. 3B is an exemplary illustration of a constructed graph based on a business process event log.

Referring now to FIG. 3A, an exemplary illustration of a business process event log with corresponding informative data is depicted. The 5 features include CaseID, Activity, Timestamp, Variable 1 and Variable 2. The 9 activities include A→B→C→B→C→D→C→B→E, denoted by the time stamps.

Referring now to FIG. 3B, an exemplary illustration of a constructed graph based on the business process event log of FIG. 3A is depicted.

An example of the building graph and formatting 6 positional vectors, $P_0$ to $p_S$, with 6 label vectors, $m_0$ to $m_S$, based on the process trace with 9 activities, A→B→C→B→C→D→C→B→E, wherein the horizontal stripes mark the edge feature vector locations. Each node comes with its initial embedding based on its name, and each edge may be associated with a positional vector $p_i$ and a label vector $m_i$. The first element in each cell of $p_i$ stands for the feature computed from the "Variable 1" column, the second may be for the "Variable 2" column. The blank space in each cell may be filled with $\{0\}^d$ where d may be the same dimension for all cells in the vector. In the exemplary illustration, d is 2 (equal to $d_e$) for p and 1 for m.

In the constructed graph view of FIG. 3B, the activity E is more closely related to and affected by activity A, connected through B, however, in a hypothetical flat sequence, such as those constructed using a Long short-term memory (LSTM) model and/or a recurring neural network (RNN), E may be depicted as the furthest event from A. In a hypothetical process, it is possible that event A may be a stating event, E may be the proceeding event, B may correspond to a "check status" activity, and events C and D happen when B "fails"; otherwise, E may directly follow B if A happened. Intuitively, in such a process E should be closely related to A, but the flat sequence where B is near the end of the sequence may not preserve such process logic.

Figure 4:
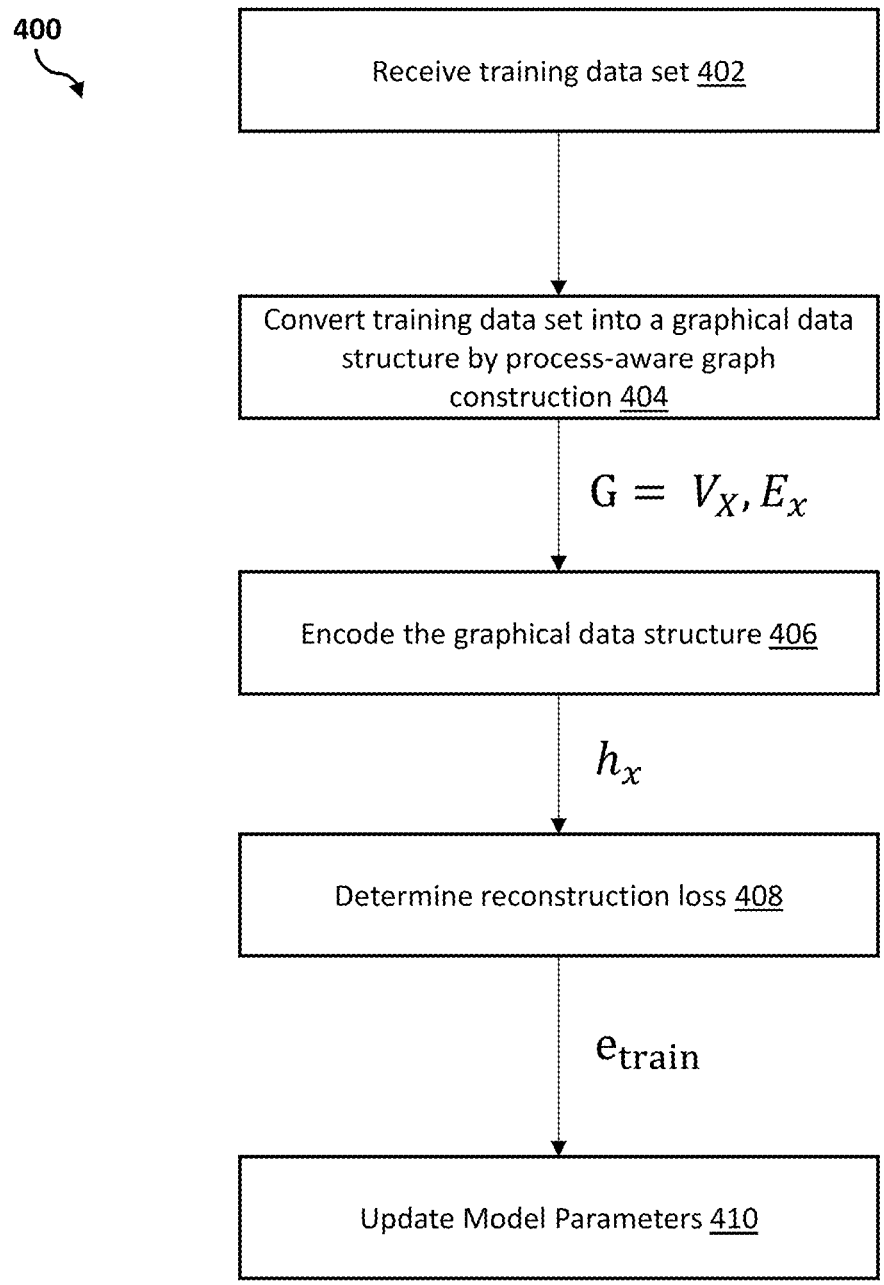
FIG. 4 is an operational flowchart illustrating a training process according to at least one embodiment.

Referring now to FIG. 4, an operational flowchart illustrating the training process 400 (e.g., training phase) used by the anomaly detection program 110 according to at least one embodiment is depicted. The training process 400 (e.g., training phase) shown in FIG. 4 is substantially similar to the anomaly detection process 200 of FIG. 2 with steps 402-410 being substantially similar to steps 202-204.

At 402, the anomaly detection program 110 receives a training data set. As described previously with respect to step 202 the training data may be received from the user and/or derived from one or more publicly available resources. For the training of the neural network the anomaly detection program 110 may utilize one or more learning rate optimization algorithms in training the neural network. During the model training phase, the autoencoder may learn the parameters through data training split which may include anomalous data. The anomalous data may include, but is not limited to including, skip anomalies, insert anomalies, rework anomalies, early anomalies, late anomalies, and/or attribute anomalies, amongst other anomalous data. For example, skip anomalies may refer to a business process sequence in which up to three events may be skipped. Insert anomalies may refer to a business process sequence in which up to three random activities may be inserted in random places within the trace of the business process. Rework anomalies may refer to a business process sequence in which up to three events may be repeated. Early anomalies may refer to a business process sequence in which up to two events may be moved backward in the trace. Late anomalies may refer to a business process sequence in which two events may be moved forward in a trace. Attribute anomalies may refer to a business process in which an attribute value may be mutated in at least three events in the trace.

As will be explained in more detail with respect to FIG. 5, the training data set and/or the validation data set may be from an initial data set comprised of business process event logs which may be split into the training data set and the validation data set by the anomaly detection program 110.

At 404, the anomaly detection program 110 converts the training data set into a graphical data structure. The anomaly detection program 110 may convert the training data set into the graphical data structure by process-aware graph construction, as described in more detail above with respect to step 202.

At 406, the anomaly detection program 110 encodes the graphical data structure. The anomaly detection program 110 may encode the graphical data structure utilizing an autoencoder.

An autoencoder may be type of neural network for unsupervised learning, which may include two main components, an encoder and/or a decoder. The encoder may take an input vector $x \in [0,1]^d$ and map it to a hidden representation $h \in [0,1]^{d'}$ by a deterministic mapping function $f_\phi$: $[0,1]^d \to [0,1]^{d'}$ parameterized by $\phi$. Symmetrically, the decoder may take the encoder output h and map it to $z \in [0,1]^d$ by a mapping function $g_\psi$: $[0,1]^{d'} \to [0,1]^d$ parameterized by $\psi$. $f_\phi$ and $g_\psi$ may be corresponding neural networks. Each input x may be first encoded into h and then decoded into z. During the training process (e.g., training phase 400) the parameters may be optimized to minimize the observed reconstruction loss (e.g., construction error) of input x and its reconstruction z through backpropagation:

$$\phi^*, \psi^* = \mathrm{argmin} L(x, z) = \mathrm{argmin} L(x, g_\psi(f_\phi(x)))$$

At 408, the anomaly detection program 110 determines a reconstruction loss (e.g., construction error). As described in more detail above with respect to step 204, the reconstruction loss (e.g., construction error) may be determined by an average of the binary cross entropy loss, as embodied in the following equation:

$$L(m', m) = \frac{1}{k(t_m - 1)} \left( -\sum_{i=1}^{k} \sum_{j=1}^{t_m-1} m_i^{(j)} \log(m_i'^{(j)}) + (1 - m_i^{(j)})(1 - \log(m_i'^{(j)})) \right)$$

At 410, the anomaly detection program 110 updates model parameters. The anomaly detection program 110 may utilize a training data set to train the autoencoder and/or a validation data set to determine an anomaly threshold θ and tune model hyper-parameters.

As described in more detail above with respect to FIG. 2, the anomaly detection program 110 may continuously alter the graph encoding during the training process 400 (e.g., training phase) such that the anomaly detection program 110 may optimize the hyperparameters of the model. Once training is completed, the graph encoding may be fixed (e.g., the same model which completed training) and/or utilized for the validation process 500 (e.g., validation phase) and/or the testing process 600 (e.g., testing phase).

The anomaly detection program may utilize the reconstruction loss (e.g., construction error) as the anomaly score, i.e., a data point with a relatively high reconstruction loss (e.g., construction error) may be considered to be an anomaly. During the training process 400 (e.g., training phase) the autoencoder may learn $f_\phi$ and $g_\psi$ through a data training split based on the equations above in step 406. As will be explained in more detail below with respect to the validation process 500 (e.g., validation phase) the reconstruction loss (e.g., construction error) threshold θ may be determined to classify anomalies during the validation phase based on another independent validation data split. Accordingly, the model inference may rely on $f_\phi$, $g_\psi$, and θ obtained from the training phase, as described above, and the validation phase, which will be described in more detail below with respect to FIG. 5.

Figure 5:
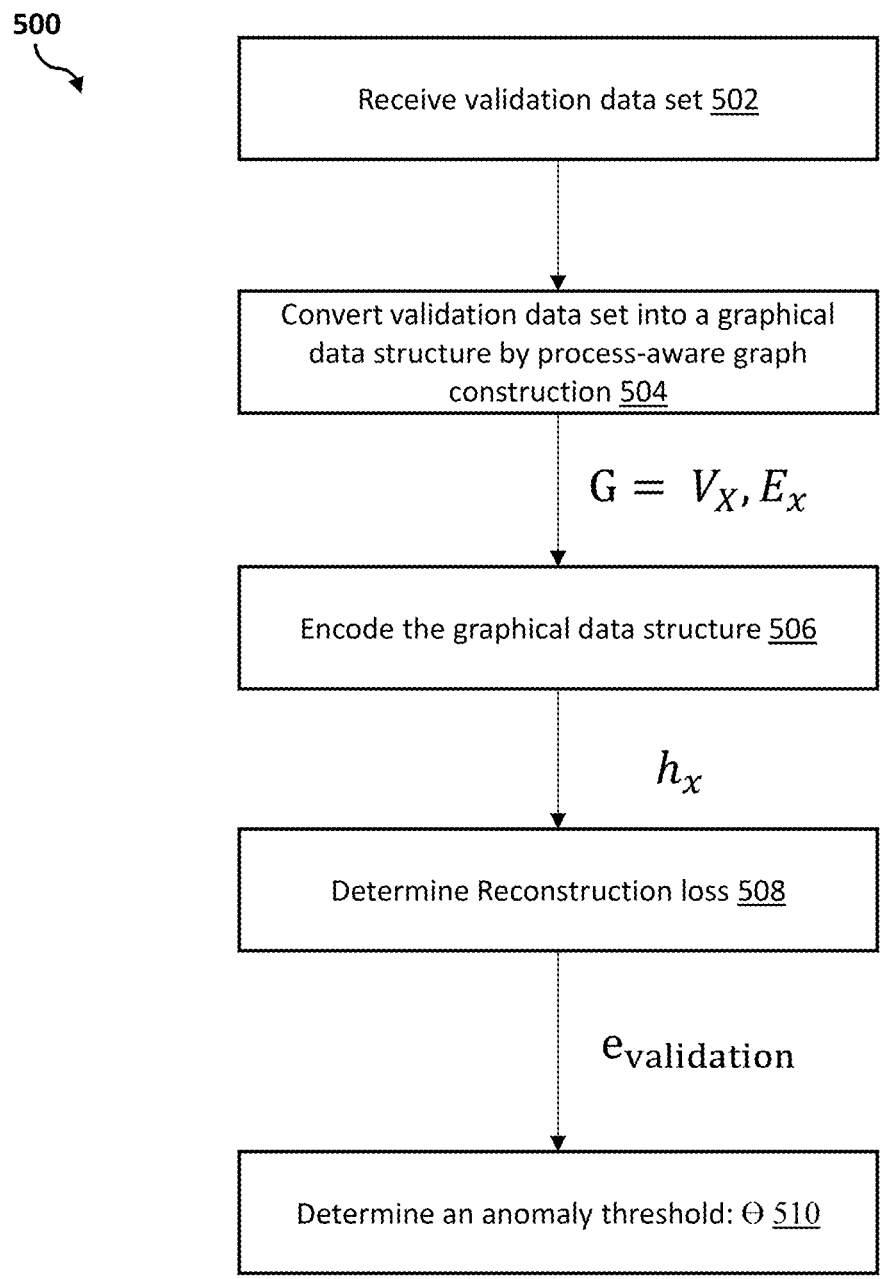
FIG. 5 is an operational flowchart illustrating a validation process according to at least one embodiment.

Referring now to FIG. 5, an operational flowchart illustrating the validation process 500 (e.g., validation phase) used by the anomaly detection program 110 according to at least one embodiment is depicted. The validation process 500 (e.g., validation phase) shown in FIG. 5 is substantially similar to the anomaly detection process 200 of FIG. 2 with steps 502-510 being substantially similar to steps 202-206.

At 502, the anomaly detection program 110 receives a validation data set. The validation data set may represent business process log data which was not utilized in training the model.

At 504, the anomaly detection program 110 converts the validation data set into a graphical data structure by process-aware graph construction. As described in more detail above with respect to step 202.

At 506, the anomaly detection program 110 encodes the graphical data structure. As described in more detail above with respect to steps 202 and 204.

At 508, the anomaly detection program 110 determines a reconstruction loss (e.g., construction error). As described in more detail above with respect to steps 204 and 206.

At 510, the anomaly detection program 110 determines an anomaly threshold. The anomaly threshold θ may be determined by the anomaly detection program 110 during the model validation phase based on the average reconstruction loss (e.g., construction loss) of validating data splits, which contain mostly anomalous data, based on the following equation:

$$L(m', m) = \frac{1}{k(t_m - 1)}\left(-\sum_{i=1}^{k}\sum_{j=1}^{t_m-1} m_i^{(j)}\log(m_i'^{(j)}) + (1 - m_i^{(j)})(1 - \log(m_i'^{(j)}))\right)$$

The anomaly detection program 110 may utilize the average reconstruction error on the validation data as opposed to the training data since the validation data may better represent data which may not have been utilized in training the model. The anomaly detection program 110 may also tune the model hyper-parameters such that it may maximize an F1 score on the validation data. An F1 score may be utilized by the anomaly detection program in combining the presenting and recall of a classifier into a single metric by taking their harmonic mean. The anomaly threshold determined by the anomaly detection program 110 may be specific to a business process. For example, the anomaly threshold for a loan approval business process event log and a order processing business process event log may be different.

Figure 6:
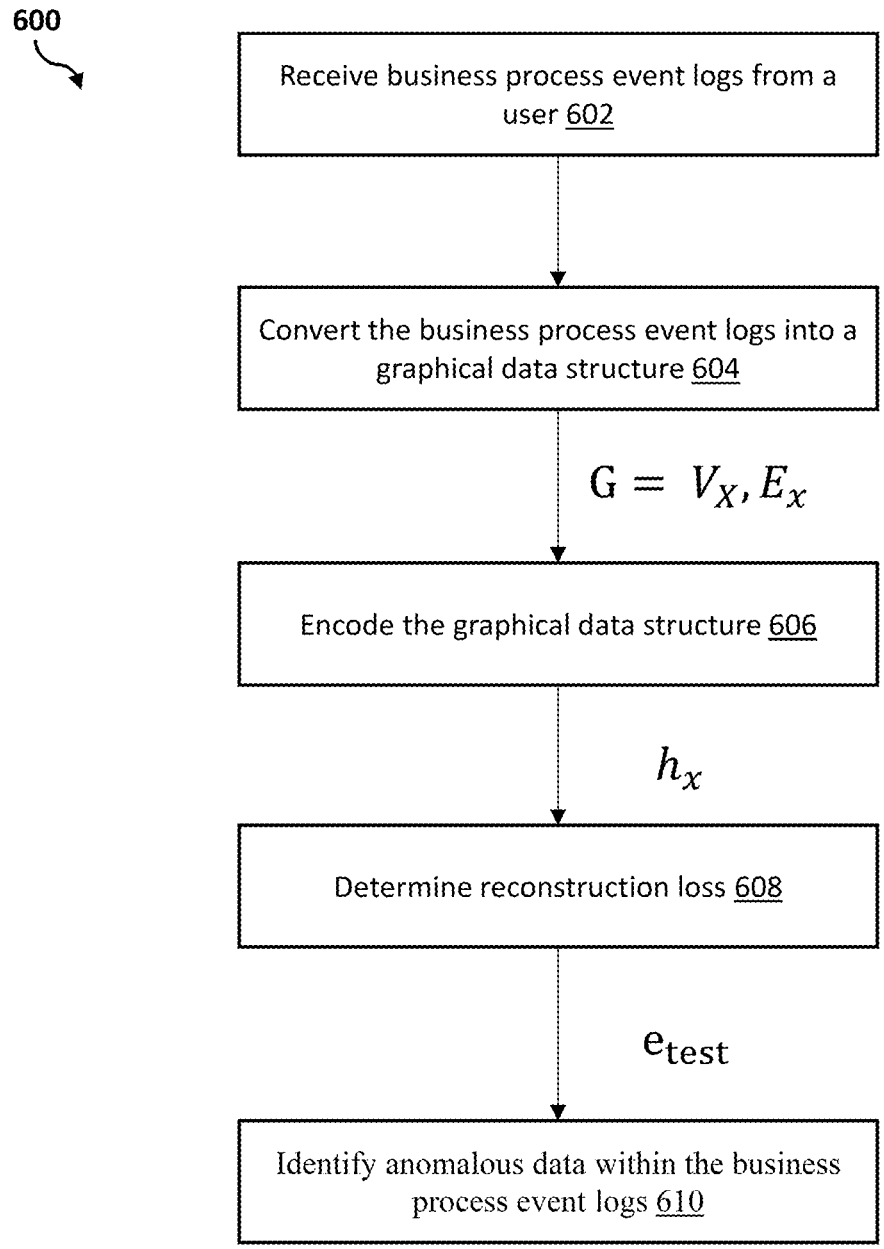
FIG. 6 is an operational flowchart illustrating an anomaly testing process according to at least one embodiment.

Referring now to FIG. 6, an operational flowchart illustrating the anomaly testing process 600 (e.g., testing phase) used by the anomaly detection program 110 according to at least one embodiment is depicted. The testing process 600 (e.g., testing phase) shown in FIG. 6 is substantially similar to the anomaly detection process 200 of FIG. 2 with steps 602-610 being substantially similar to steps 202-208.

At 602, the anomaly detection program 110 receives business process event logs. The anomaly detection program 110 may receive the business process event logs from a user in the anomaly detection user interface 118, as described in more detail above with respect to step 202. The business process event logs received by the anomaly detection program 110 may differ with respect to embodiments.

In at least one embodiment, the anomaly detection program 110 may utilize the initial data set in which the training data set and/or the validation data set were derived. In this embodiment, the testing process 600 may be utilized in checking the performance of the optimized graph encoding for anomaly detection.

In another embodiment, the anomaly detection program 110 may utilize the business process event logs received from the user in the anomaly detection user interface 118. In this embodiment, the testing process 600 may be utilized in computing the anomaly score for each of the one or more data points of each business process event log as described in more detail above with respect to FIG. 2.

The anomaly detection program 110 may utilize the initial data set in which the training data set and/or the validation data set were derived if the testing process 600 may At 604, the anomaly detection program 110 converts the business process event logs received from the user into a graphical data structure, as described in more detail above with respect to step 202.

At 606, the anomaly detection program 110 encodes the graphical data structure, as described in more detail above with respect to step 204.

At 608, the anomaly detection program 110 determines a reconstruction loss (e.g., construction error), as described in more detail above with respect to step 206.

At 610, the anomaly detection program 110 identifies anomalous data within the business process event logs. The anomaly detection program 110 may identify the anomalous data within the business process event logs by comparing the reconstruction loss (e.g., construction error) derived at step 608 with the anomaly threshold θ determined at step 510 of the validation process 500.

It may be appreciated that FIGS. 2 through 6 provide only an illustration of one embodiment and do not imply any limitations with regard to how different embodiments may be implemented. Many modifications to the depicted embodiment(s) may be made based on design and implementation requirements.

Figure 7:
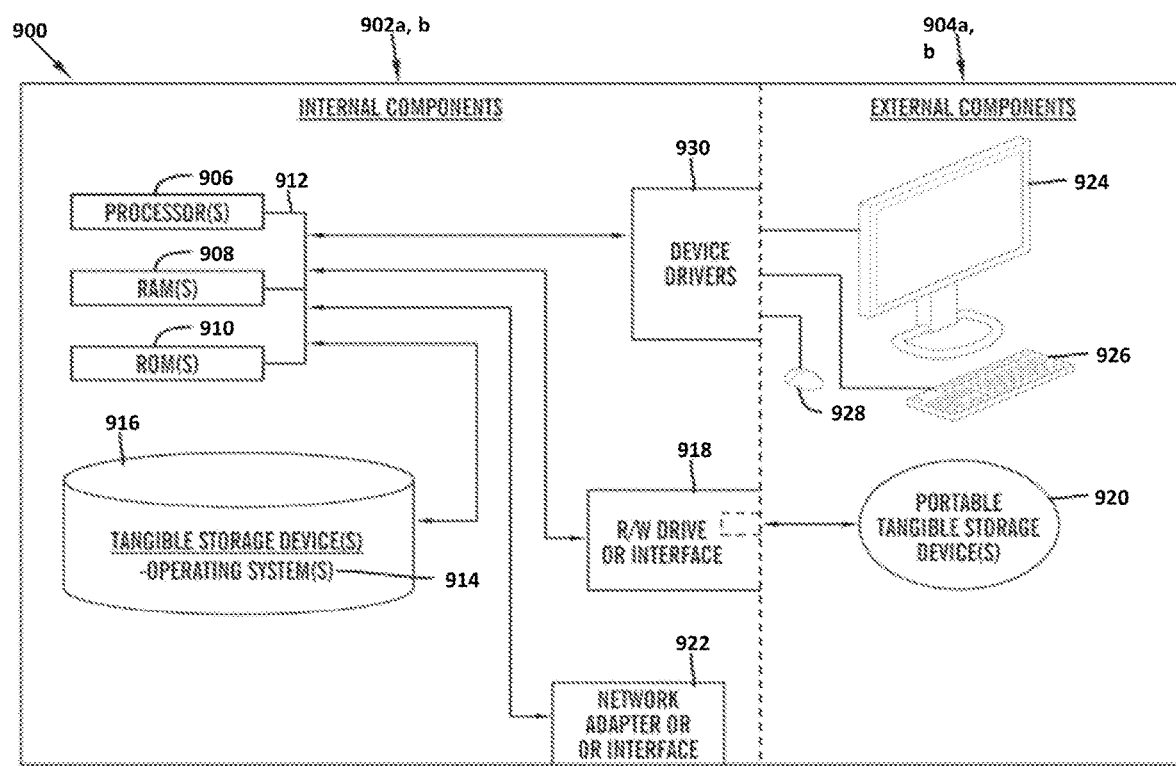
FIG. 7 is a block diagram of internal and external components of computers and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 7. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the anomaly detection program 110a in client computer 102, and the anomaly detection program 110b in network server 112, may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the anomaly detection program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the anomaly detection program 110a in client computer 102 and the anomaly detection program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the anomaly detection program 110a in client computer 102 and the anomaly detection program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
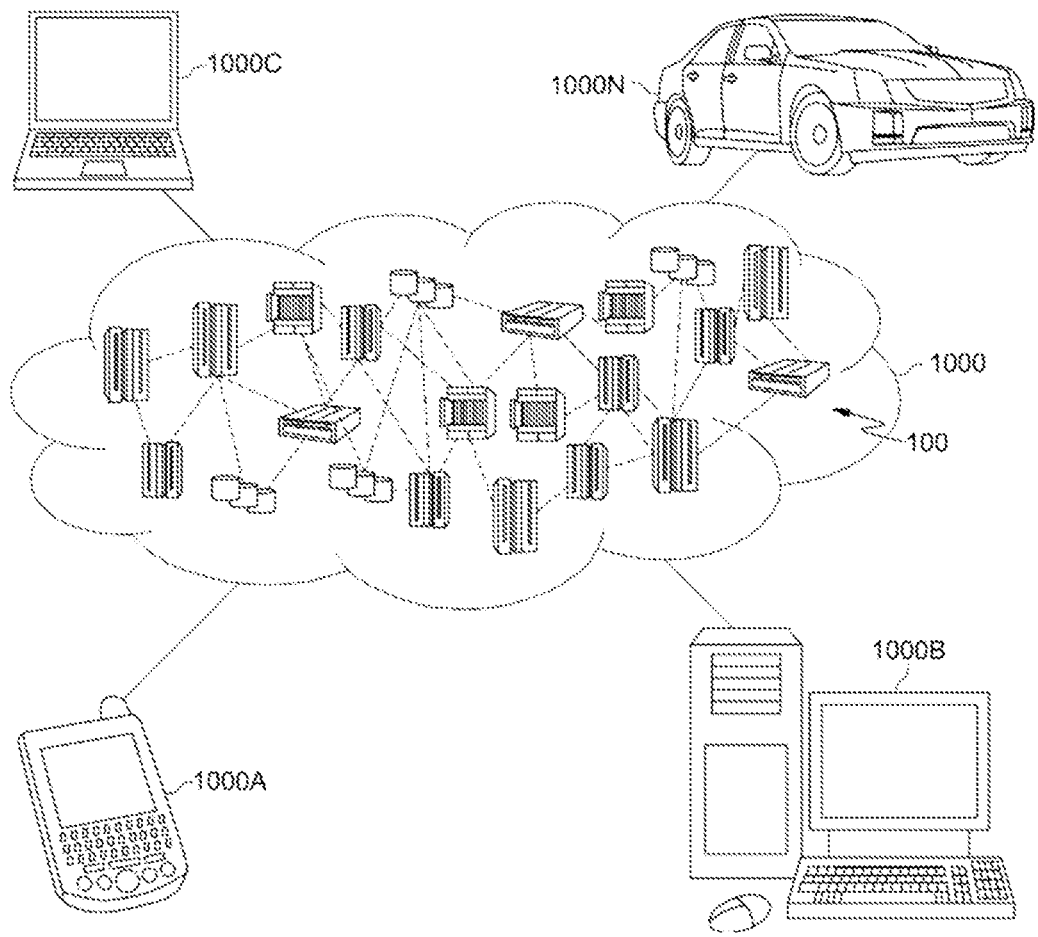
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 100 and cloud computing environment 1000 can communicate with any type of computerized device over any type of network and/or network addressable connection (e.g., using a web browser).

Figure 9:
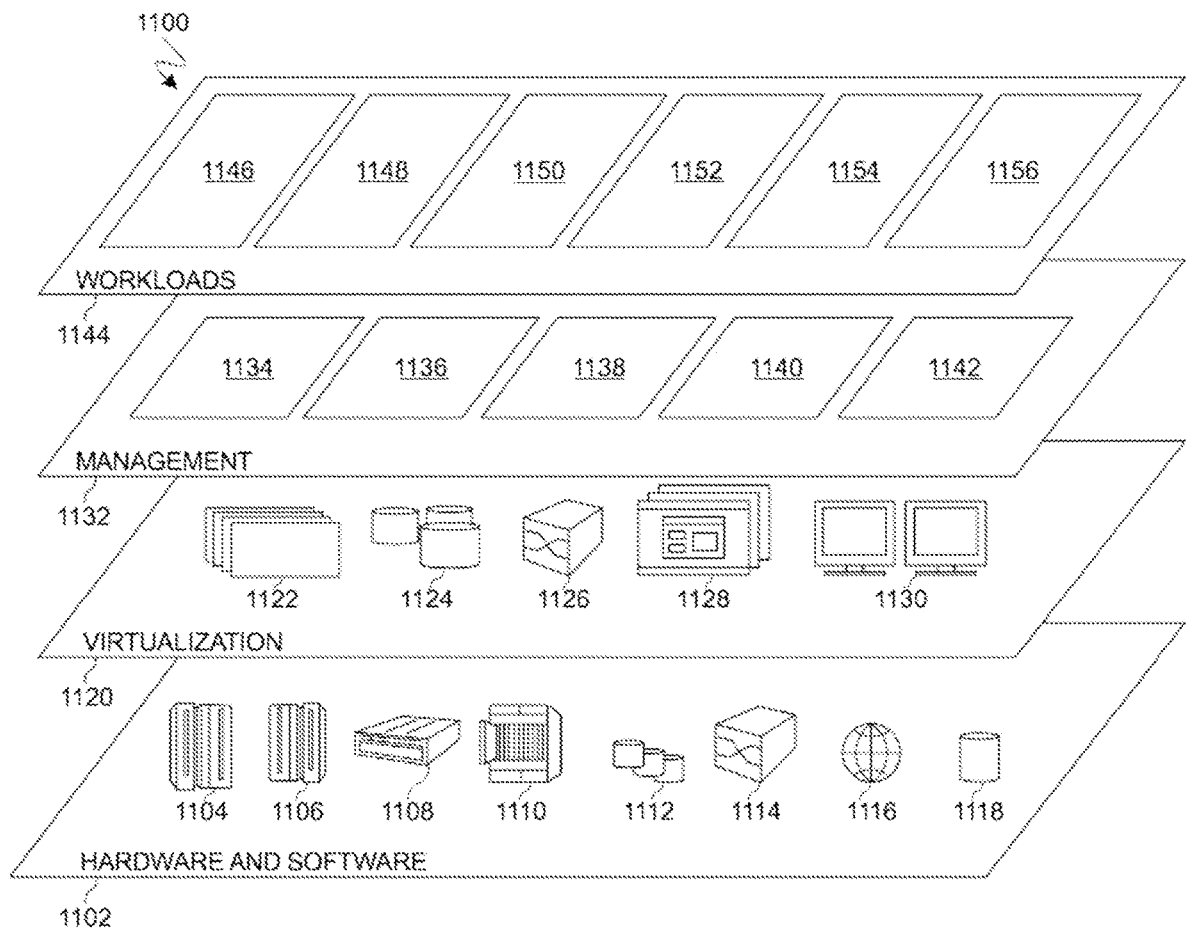
FIG. 9 is a block diagram of functional layers of the illustrative cloud computing environment of FIG. 8, in accordance with an embodiment of the present disclosure.

Referring now to FIG. 9, a set of functional abstraction layers 1100 provided by cloud computing environment 1000 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and the anomaly detection program 1156. An anomaly detection program 110a, 110b provides a way to identify anomalous events within business process logs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method for anomaly detection, the method comprising:
converting, by a processor, business process logs into a graphical data structure;
generating, by the processor, an optimized graph encoding for anomaly detection using an unsupervised machine learning method, wherein the optimized graph encoding is a result of continuously altering a graph encoding throughout a training process;
updating, by the processor, one or more hyperparameters of a graph autoencoder (GAE) using at least one or more learning rate optimization algorithms and a set of anomalous data, wherein the GAE simplifies the training process by recreating abstract structural process information;

computing, by the processor, an anomaly score for each activity of the business process log using a process aware metric-based on a feature representation; and labeling, by the processor, each of one or more data points with a high anomaly score.

2. The method of claim 1, wherein generating the optimized graph encoding for anomaly detection includes applying a graph neural network (GNN) with an edge-conditioned convolution (ECC).

3. The method of claim 2, wherein computing the anomaly score includes a reconstruction loss from the GAE, wherein the reconstruction loss is minimized through backpropagation.

4. The method of claim 1, wherein the high anomaly score is determined in comparison to an anomaly threshold value, wherein the anomaly threshold value is determined based on an average reconstruction error in a validation phase.

5. The method of claim 4, further comprising:
alerting, by the processor, a user using one or more notifications for each of the one or more data points with the high anomaly score, wherein the one or more notifications are presented to the user utilizing one or more different methods depending on a difference between the high anomaly score and the anomaly threshold for each of the one or more data points.

6. The method of claim 1, further comprising:
utilizing, by the processor, a reconstructed process graph with edge probability to interpret an anomaly case; wherein the reconstructed process graph is displayed to a user in an anomaly detection user interface.

7. The method of claim 1, wherein converting the business process logs into the graphical data structure further comprises:
building, by the processor, a directed graph, wherein activities from the business process logs are utilized as nodes and edges within the directed graph correspond to every pair of adjacent events in a time ordered trace.

8. The method of claim 1, further comprising:
providing, by the processor, one or more insights as to the nature of the one or more data points labeled as anomalies, wherein the one or more insights are provided to a user within an anomaly user interface.

9. The method of claim 8, wherein the one or more insights includes at least a recommendation detailing how to resolve the one or more datapoints labeled as anomalies based on a comparison of publicly available business process event logs stored in a knowledge corpus with the business process event logs received from the user.

10. A computer system for anomaly detection, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
converting business process logs into a graphical data structure;
generating an optimized graph encoding for anomaly detection using an unsupervised machine learning method, wherein the optimized graph encoding is a result of continuously altering a graph encoding throughout a training process;
updating one or more hyperparameters of a graph autoencoder (GAE) using at least one or more learning rate optimization algorithms and a set of anomalous data, wherein the GAE simplifies the training process by recreating abstract structural process information;
computing an anomaly score for each activity of the business process log using a process aware metric-based on a feature representation; and
labeling each of one or more data points with a high anomaly score.

11. The computer system of claim 10, wherein generating the optimized graph encoding for anomaly detection includes applying a graph neural network (GNN) with an edge-conditioned convolution (ECC).

12. The computer system of claim 11, wherein computing the anomaly score includes a reconstruction loss from the GAE, wherein the reconstruction loss is minimized through backpropagation.

13. The computer system of claim 10, wherein the high anomaly score is determined in comparison to an anomaly threshold value, wherein the anomaly threshold value is determined based on an average reconstruction error in a validation phase.

14. The computer system of claim 10, further comprising:
program instructions, stored on at least one of the one or more computer-readable storage media for execution by at least one of the one or more processors via at least one of the one or more memories, to utilize a reconstructed process graph with edge probability to interpret an anomaly case; wherein the reconstructed process graph is displayed to a user in an anomaly detection user interface.

15. The computer system of claim 10, further comprising:
program instructions, stored on at least one of the one or more computer-readable storage media for execution by at least one of the one or more processors via at least one of the one or more memories, to build a directed graph, wherein activities from the business process logs are utilized as nodes and edges within the directed graph correspond to every pair of adjacent events in a time ordered trace.

16. A computer program product for anomaly detection, comprising:
one or more non-transitory computer-readable storage media and program instructions stored on at least one of the one or more tangible storage media, the program instructions executable by a processor to cause the processor to perform a method comprising:
converting business process logs into a graphical data structure;
generating an optimized graph encoding for anomaly detection using an unsupervised machine learning method, wherein the optimized graph encoding is a result of continuously altering a graph encoding throughout a training process;
updating one or more hyperparameters of a graph autoencoder (GAE) using at least one or more learning rate optimization algorithms and a set of anomalous data, wherein the GAE simplifies the training process by recreating abstract structural process information;
computing an anomaly score for each activity of the business process log using a process aware metric-based on a feature representation; and
labeling each of one or more data points with a high anomaly score.

17. The computer program product of claim 16, wherein generating the optimized graph encoding for anomaly detection includes applying a graph neural network (GNN) with an edge-conditioned convolution (ECC).

18. The computer program product of claim 17, wherein computing the anomaly score includes a reconstruction loss from the GAE, wherein the reconstruction loss is minimized through backpropagation.

19. The computer program product of claim 16, wherein the high anomaly score is determined in comparison to an anomaly threshold value, wherein the anomaly threshold value is determined based on an average reconstruction error in a validation phase.

20. The computer program product of claim 16, further comprising:
  program instructions, stored on at least one of the one or more computer-readable storage media, to utilize a reconstructed process graph with edge probability to interpret an anomaly case; wherein the reconstructed process graph is displayed to a user in an anomaly detection user interface.

\* \* \* \* \*